United States Patent [19]

Hill et al.

[11] Patent Number: 5,170,718

[45] Date of Patent: * Dec. 15, 1992

[54] RAILROAD FREIGHT CAR WITH WELL FOR STACKED CARGO CONTAINERS

[75] Inventors: Charles C. Hill; Gareth R. Thomas, both of Del Mar, Calif.; Gary S. Kaleta, Warren; Gregory J. Saxton, Portland, both of Oreg.

[73] Assignee: Gunderson, Inc., Portland, Oreg.

[*] Notice: The portion of the term of this patent subsequent to Jan. 16, 2007 has been disclaimed.

[21] Appl. No.: 687,467

[22] Filed: Apr. 17, 1991

Related U.S. Application Data

[63] Continuation-in-part of Ser. No. 451,378, Dec. 15, 1989, Pat. No. 5,054,403, which is a continuation-in-part of Ser. No. 234,332, Aug. 18, 1988, Pat. No. 4,893,567.

[51] Int. Cl.$^5$ .............................. B61F 1/00
[52] U.S. Cl. .................... 105/404; 105/4.1; 105/4.11; 105/199.3
[58] Field of Search .............. 105/3, 4.1, 4.2, 4.3, 105/355, 404, 411, 413, 414, 418, 419, 199.3; 410/52, 90, 71, 54, 68

[56] References Cited

U.S. PATENT DOCUMENTS

| | | | |
|---|---|---|---|
| 3,319,583 | 5/1967 | Gutridge | 105/366 |
| 3,357,371 | 12/1967 | Gutridge | 105/414 |
| 3,616,764 | 11/1971 | Johnson et al. | 105/366 |
| 3,981,548 | 9/1976 | MacDonnell et al. | 105/199.3 |
| 4,091,742 | 5/1978 | Cordani | 105/366 |
| 4,408,810 | 10/1983 | Geyer | 105/199.3 |
| 4,456,413 | 6/1984 | Pavlick | 105/4.1 |
| 4,524,699 | 6/1985 | Pavlick | 105/4 |
| 4,599,949 | 1/1986 | Hill | 105/355 |
| 4,624,188 | 11/1986 | Kaleta | 105/355 |
| 4,703,699 | 11/1987 | Hill | 105/355 |
| 4,718,353 | 1/1988 | Schuller et al. | 105/406.1 |
| 4,750,431 | 6/1988 | Yates et al. | 105/4.1 |
| 4,751,882 | 6/1988 | Wheatley et al. | 105/4.1 |
| 4,754,709 | 7/1988 | Gramse et al. | 105/355 |
| 4,771,706 | 9/1988 | Lindauer et al. | 105/419 |
| 4,782,762 | 11/1988 | Johnstone et al. | 137/355 |
| 4,805,539 | 2/1989 | Ferris et al. | 105/404 |
| 4,841,876 | 6/1989 | Gramse et al. | 105/4.1 |
| 4,862,810 | 9/1989 | Jamrozy et al. | 105/355 |
| 4,889,055 | 12/1989 | Tamrozy et al. | 105/419 |
| 4,893,567 | 1/1990 | Hill et al. | 105/419 |
| 4,905,608 | 3/1990 | Terlecky et al. | 105/355 |
| 4,949,646 | 8/1990 | Jamrozy et al. | 105/411 |
| 5,054,403 | 10/1991 | Hill et al. | 105/419 |

Primary Examiner—Robert J. Oberleitner
Assistant Examiner—Mark T. Le
Attorney, Agent, or Firm—Chernoff, Vilhauer, McClung & Stenzel

[57] ABSTRACT

A multi-unit articulated railway freight car defining a container well in each of the several units, with container support members attached to the side sills of each unit to support standard intermodal cargo containers at a location low enough to permit a second tier of containers to be stacked atop a bottom tier without exceeding the maximum height restrictions of most main railroad lines, although ample clearance is preserved beneath the bottom of the car when fully loaded. Each container support member is constructed of thick plate steel of high strength, formed cold to include residual internal stresses in order to resist failure when subjected to the loads imposed by supporting loaded containers carried in the container well. The side sill structures are of box tube and formed sheet construction of small enough width to permit carriage of newer, larger, sizes of intermodal cargo containers without the car or containers protruding outside the clearance available along most railroad lines. A truss structure interconnects the bottom chords of the side sills and interconnects the cargo container support members. Members of the truss structure are attached to the cargo container support members by hinges. Roller-assisted, constant-contact side bearings and softer springs are used in a single-unit version of the car.

19 Claims, 10 Drawing Sheets

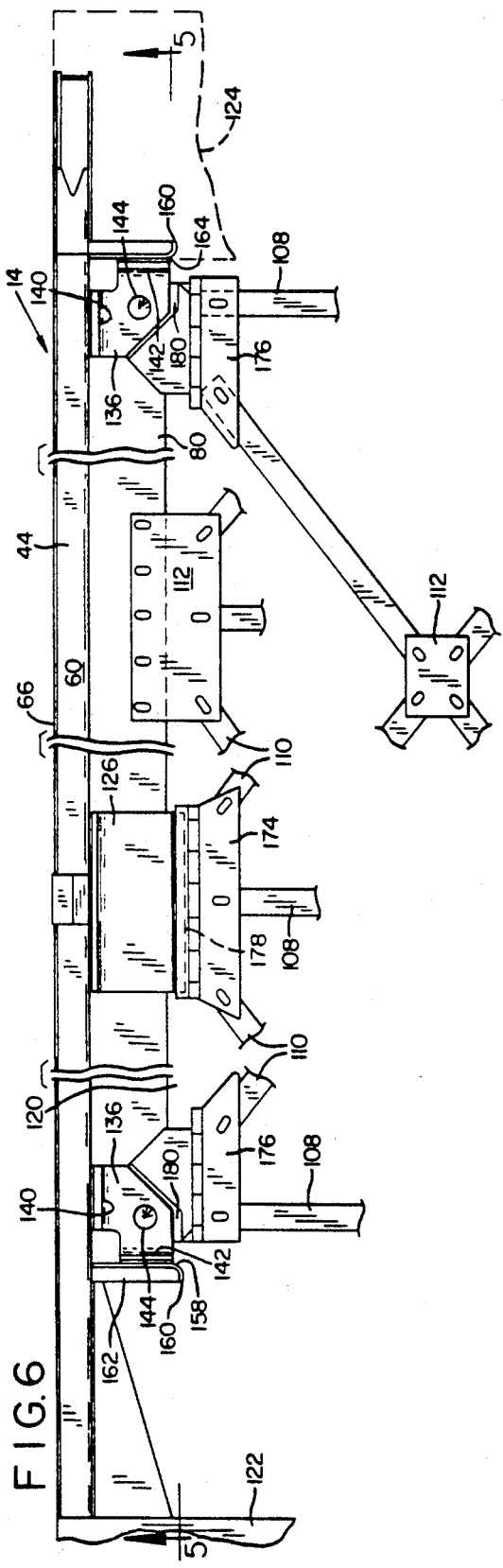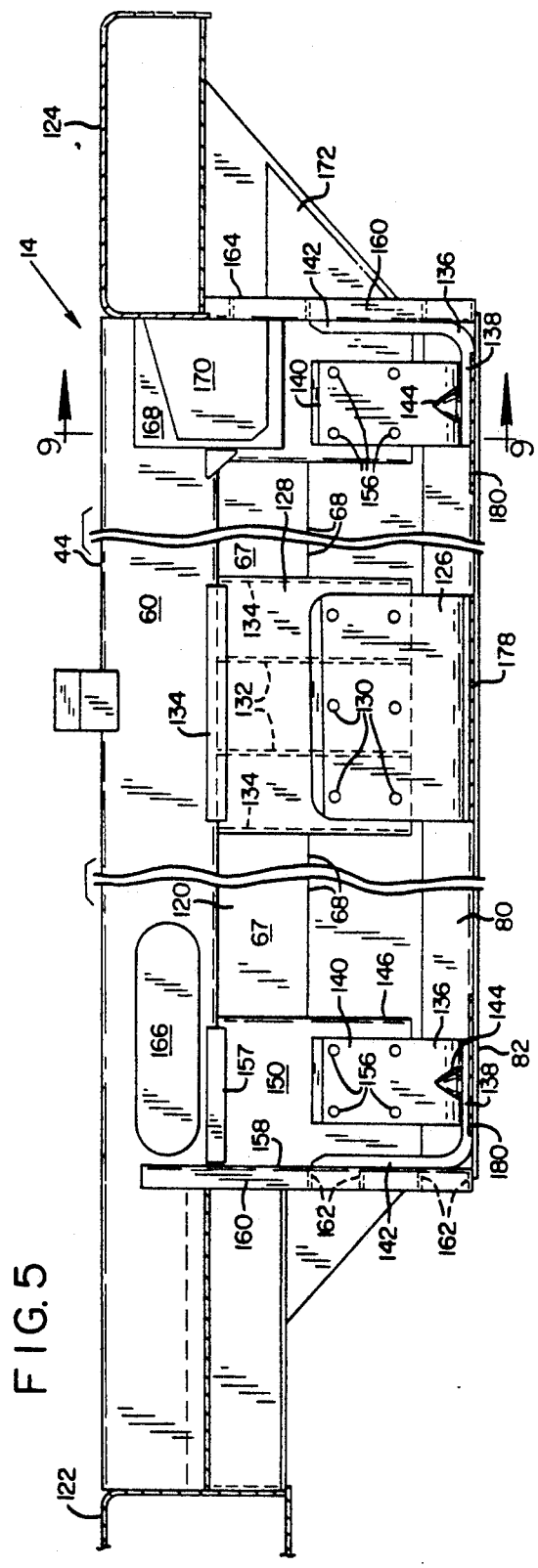

RAILROAD FREIGHT CAR WITH WELL FOR STACKED CARGO CONTAINERS

This application is a continuation-in-part of U.S. patent application No. 07/451,378, filed Dec. 15, 1989, now U.S. Pat. No. 5,054,403 which is a continuation-in-part of U.S. patent application Ser. No. 07/234,332, filed Aug. 18, 1988, now U.S. Pat. No. 4,893,567 issued Jan. 16, 1990.

BACKGROUND OF THE INVENTION

The present invention relates to railroad cars, and particularly to a railroad car defining a well, for carrying intermodal cargo containers stacked one upon another.

In order to obtain better overall fuel efficiency in carrying containerized cargo over long distances, intermodal cargo containers are often carried on railroad cars in situations where rail transport does not interfere with achievement of required delivery dates. Multi-unit articulated railroad cars can be built strong enough to carry containers stacked one atop another, since containerized cargo is usually not so dense that car weight combined with the weight of loaded containers will exceed the maximum weights which can be imposed upon railroad tracks. When containers are stacked two containers high on a railroad car, however, overall height is a definite consideration, since only a limited height such as 20'2", or in some cases less, is available on some main railroad track lines, and it is therefore desirable to provide a car capable of carrying containers stacked two high yet with the maximum height of the loaded car as low as possible, even when carrying empty containers.

Similarly, the dimensions of a car capable of carrying containers must be within width restrictions resulting from signals and other equipment located alongside tracks. The width of a car midway between its trucks must be narrower when the truck spacing is greater, in order for the car to remain within the available clearance envelope as curved track is negotiated. Lateral clearance is particularly a problem in the design of railroad cars intended to carry containers such as 48-foot-long 102-inch wide containers, rapidly becoming an accepted size in the transportation industry, since such containers are of a greater width than shorter containers, and yet a car carrying such a container must still fit within the available clearance, since the cost of modifying railway track lines to provide greater clearance is prohibitive.

Sufficient clearance must also be maintained beneath a car while sufficient stiffness of the side sill structures and the floor structures, if any, of the car must be provided, and the maximum height of the side sills must be kept low enough to permit use of the container loading cranes and associated equipment in use at container loading yards.

Intermodal cargo containers are constructed to be carried with their weight transmitted through load carrying structures normally located at the corners of shorter containers and sometimes spaced longitudinally a short distance from the corners of longer standard containers. Standard containers include vertical load-bearing structures permitting such containers to be stacked one atop another and to be interconnected to prevent separation during transport. The locations of the load bearing structures in the containers are standardized so that containers having various lengths such as 20 feet, 24 feet, 40 feet, 45 feet, or 48 feet can be supported on support structures provided at standard spacings on highway truck chassis, on railroad cars, and in container-ship holds. Such support structures must be capable of supporting the entire load of containers and the enclosed cargo, yet must fit within the limited amount of space available, which, in the case of containers on railroad cars, is defined partly by the clearance available along track lines. The problem of designing a car with sufficient strength to support cargo containers during operation of a train, where dynamic loads caused by track unevenness, car performance dynamics, centrifugal force, and wind forces are applied, is complicated by the desirability of rail carriage of wider, heavier, and longer containers, necessitating longer railroad car truck spacings, while keeping the lateral and vertical dimensions of the car within the available clearance envelope.

As a result of these competing considerations, the structure of a railroad car for carrying stacked cargo containers must be strong, shallow, and narrow, yet not too expensive to build. Others have attempted to solve similar problems in previously available railroad cars by using corner castings or weldments incorporating container support structures, and have used stiffened floor structures interconnecting the side sills of a well car, in order to provide sufficient strength to carry the loads imposed by loaded intermodal cargo containers or trailers. Conventionally accepted engineering practice has taught previously that the construction of container support structures massive enough to support the expected loading, yet remain in the space available, would require heating the metal to bend, weld, or cast the necessary structure, adding to the cost of a car.

Previous attempts to construct a satisfactory railroad car for carrying the longer, wider, containers have not been entirely successful. They have resulted in an undesirably great height of a loaded car, particularly when carrying two containers stacked one atop the other with a light load weight, or they have been unable to withstand the forces of carrying loaded containers without early failure. A further consideration in such railroad cars is that of providing lateral stability to resist rolling over, in view of the height of the center of gravity of cars loaded with cargo containers stacked atop one another, particularly where a longer container is carried atop a shorter one. Superelevation of one of a pair of rails, provided to accommodate high-speed passenger train operation, may cause problems in maintaining the stability of a freight car carrying cargo containers stacked one atop another, particularly where forces resulting from irregularities of the track are superimposed on the normal dynamic forces resulting from operating the train. It has previously been thought that the use of multi-unit articulated car construction was highly desirable, if not absolutely necessary, in such cars, because of the ability of adjacent units of one multi-unit car to stabilize one another as a car moves along railroad tracks. It was felt that a conventional single-unit car, with both ends supported on unshared trucks, lacked sufficient stability for safe operation with containers stacked one atop another. One factor in such stability of a car during operation is the tendency of trucks in previously known cars to "hunt," that is, oscillate directionally about a vertical axis of rotation with respect to the car body. Such oscillation has occurred because of the need to allow cars to negotiate curves in tracks without requiring too much power to rotate the trucks with respect to the car body, particularly when the side bearings are loaded, even though some resistance to turning is known to be desirable to avoid such oscillation, particularly for empty cars travelling at higher speeds.

Yet a further consideration resulting from the use of increasingly longer cargo containers is the need for a container-carrying car to be able to negotiate curves and hills satisfactorily, within the clearances available along the tracks, and taking into consideration the twisting forces which may be encountered by a longer car as a result of the transition of the tracks into a condition of superelevation of the outer rail in a curved length of track. The difference in superelevation between opposite ends of a long car leaves the inside front and outside rear wheels of a car entering a curve more lightly loaded than the others, making it more likely that such wheels may climb the rails.

As a result, what is needed is an improved railroad freight car for carrying large intermodal cargo containers with a resultant overall height of the loaded car which is as small as possible, yet with sufficient clearance beneath the car and with sufficient lateral clearance for operation of the loaded car on most railroad lines, and with sufficient stability for reliably safe operation of single-unit cars with unshared trucks carrying containers stacked two tiers high.

SUMMARY OF THE INVENTION

The present invention provides a lightweight railcar, which may be either of multi-unit articulated construction or single-unit construction, in which each car unit defines a well for carrying intermodal cargo containers stacked one upon another, and which achieves a combination of desirable objectives by having at least the minimum required clearance beneath the car and maintaining sufficient lateral clearance along the sides of the car, and still is capable of carrying two large containers stacked one upon another with an overall height which is low enough, in a design providing a car which is strong enough, stable enough in operation, and durable enough for operation on existing railroads.

The present invention provides a railcar having lightweight side sills each including a relatively deep rectangular tubular upper chord portion, a web portion which is a single thickness of plate material including a vertical upper portion, a diagonal portion extending inward and downward to contribute to a stiffer web structure, and a lower chord portion of material of substantially greater thickness than that of the web and the rectangular tube upper chord portion. The lower chord portion of the side sill includes a diagonally upwardly extending leg and a horizontal, inwardly directed leg. A truss structure of diagonally and transversely extending members connects the bottom chords of the two side sills to each other to assist in stiffening the structure of the whole car for purposes of resisting buckling of the side sills caused by the loads encountered during operation of the car.

Container support assemblies are attached to the side sills at particular locations to receive the load-supporting structural portions of cargo containers. The container support structures each include a container support hanger bracket weldment of plate material including a vertical face portion substantially parallel with the side sill, and vertical and horizontal stiffener portions perpendicular to the vertical face. The hanger brackets are fastened by welding to the side sill top tube and web. A container support member is of relatively very thick, high strength plate material, bent on an exceptionally small radius of curvature, without heating, to define a horizontal portion on which a load bearing structure of a container is supported, and one or more upwardly extending portions.

Mechanical fasteners, such as rivets or bolts, are used to attach the container support members to the hanger bracket assemblies, rather than welding the container support members to the side sills, to avoid the problems which accompany welding thick structures of high strength steel, so as to avoid degrading the fatigue resistant characteristics and preserve the advantages derived by cold forming of the metal.

In the case of some car units, especially those designed to accept containers which extend the entire length of the container well, a container support member may be attached to the body bolster of the car, as well as to the side sill, by an additional hanger bracket welded to the body bolster and depending downwardly therefrom. A respective upwardly extending portion of such a container support member is attached by mechanical fasteners to the hanger bracket depending from the body bolster.

Horizontal transverse and diagonal tension/compression members may be attached to each of a pair of oppositely located container support members by the use of a hinge whose hinge axis of rotation extends horizontally and longitudinally of the car, permitting the container support member to flex when loaded, without applying bending stresses to the horizontal members joining the oppositely located support members. Additionally, downward flexion of the container support member will bring it to bear downwardly upon the upper surface of the inwardly directed horizontal leg of the lower chord of the side sill, which will then provide a portion of the necessary upwardly directed force to support a container.

The choice of a high strength metal and ample length of the container support members provides the required strength in the container support members to withstand expected loads safely without the need to use material so thick that it would occupy space which is critically limited in the corner area at the bottom edge of the side sills. The car of the present invention is thus able to be constructed to fit within the available clearance, yet provides sufficient interior width in the container well to accept standard cargo containers nominally 102 inches wide.

In a single-unit car according to the invention, with an unshared truck and a conventional coupler at each end, adequate lateral stability is obtained, despite a high center of gravity when such a car is laden, by equipping such a single-unit car with roller-assisted, constant-contact side bearings and by providing softer springs, with a greater range of movement, in the trucks supporting the car body. Such roller-assisted, constant-contact side bearings provide needed resistance to undesirable turning of the trucks without too much resistance to turning of the trucks being created by increasing loads carried by the side bearings, as when the car enters or exits curves in a track. An additional factor is the use of a longer car body and correspondingly greater separation between trucks, helping to avoid regenerative oscillation resulting from the truck separation distance being too closely similar to the length of individual rail sections, which is normally 39 feet.

It is therefore a principal object of the present invention to provide an improved lightweight railcar of multi-unit or single-unit configuration for carrying cargo containers stacked one upon another.

It is a further object of the present invention to provide an improved railcar capable of carrying wide, long, standard intermodal cargo containers stacked one upon another without extending beyond applicable clearance limitations.

It is yet a further object of the present invention to provide an improved railcar having the capacity and adequate stability to carry a greater weight of revenue-producing lading, in a single-unit car of light weight.

It is an important feature of the railroad car of the present invention that it includes a container support member of thick high strength steel plate supported by and fastened by mechanical fasteners to a hanger bracket welded to the side sill of the car.

It is a further feature of the present invention that it provides a side sill of strong yet lightweight construction.

An additional feature of the present invention is the provision of hinges connecting transverse tension members to the container support members on opposite sides of the car.

Yet a further feature of the present invention is the use of roller-assisted, constant-contact side bearings in a single-unit car for carrying stacked cargo containers.

A principal advantage of the present invention is that it provides an improved railcar of sufficient strength, and able to carry loaded cargo containers closer to the rails, yet with sufficient bottom clearance.

A further advantage of the railcar of the present invention is that it provides sufficient strength and load-carrying capacity in a car which can be built more economically than previously available railcars for the same purpose.

The foregoing and other objectives, features and advantages of the present invention will be more readily understood upon consideration of the following detailed description of the invention taken in conjunction with the accompanying drawings.

BRIEF DESCRIPTION OF THE DRAWINGS

FIG. 5 is a sectional view of a portion of an end unit of the car shown in FIG. 1, taken along line 5—5 of FIG. 6.

FIG. 6 is a top plan view of a portion of an end unit of the multi-unit freight car shown in FIG. 1, at an enlarged scale.

DETAILED DESCRIPTION OF THE INVENTION

Figure 1:
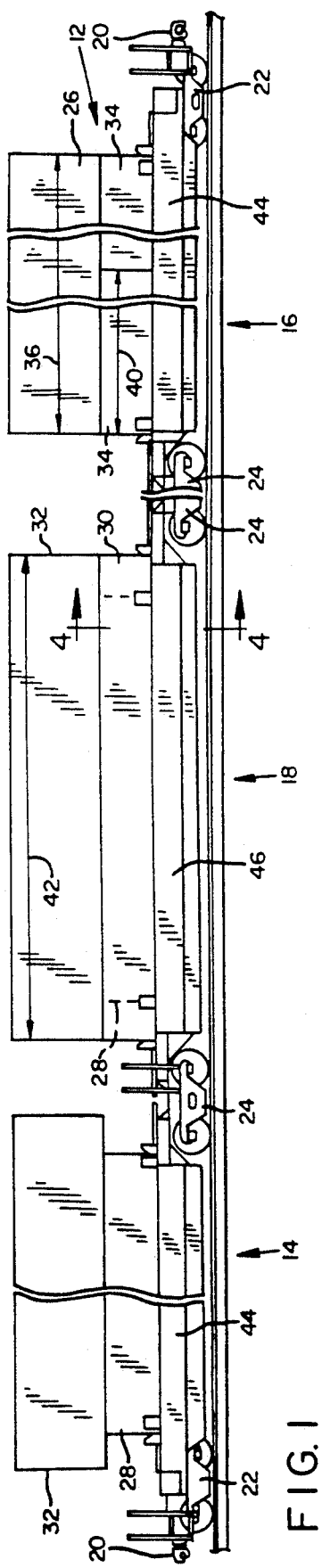
FIG. 1 is a side elevational view of an exemplary articulated, multi-unit freight car embodying the present invention.

Referring first to FIGS. 1-9 of the drawings, a multi-unit, articulated railway freight car 12 includes a pair of end units 14 and 16 and at least one intermediate unit 18, of which only one is shown completely. A coupler 20 and a truck 22 are provided at each end of the car, and trucks 24 are provided between each end unit 14 or 16 or intermediate unit 18 and the adjacent intermediate unit 18. Because each truck 24 supports the ends of both an intermediate unit 18 and either another intermediate unit 18 or an end unit 14 or 16, the trucks 24 should have a greater weight-carrying capacity than is necessary for the trucks 22 at each end of the car 12.

As shown in FIG. 1, each of the end units 14, 16 is capable of carrying a pair of cargo containers 32 and 28, with the container 32 stacked atop the container 28. In the intermediate unit 18 a container 30 is carried with a container 32 stacked atop it. In each case the upper container is securely fastened to the lower container using conventional connectors.

Alternatively, a shorter container 28, indicated by broken lines, could be held in the lower tier of the intermediate unit 18, below the container 32. Furthermore, a pair of containers 34, each half as long as a single container 28, could be placed in the lower tier of either of the end units 14 or 16, as shown in the end unit 16, and a single container 32 might be stacked atop the container 28, as shown on the end unit 14 at the left end of FIG. 1.

Cargo containers of the sort used for intermodal transportation of goods are available in several standard sizes, and the car 12 is intended to be able to carry containers of a number of such sizes. For example, the cargo container 26 may be a standard cargo container having a nominal length 36 of 40 feet. Similarly, the cargo container 28 may be a standard 40-foot container. The cargo container 30, shown in the lower tier of the intermediate unit 18 in FIG. 1, like the cargo container 32, shown in the upper tiers of end unit 14 and of the intermediate unit 18 illustrated in FIG. 1, may be a cargo container having a length 42 of 48 feet, which overhangs each end of the 40-foot container 28 shown in the end unit 14 and stacks evenly above the container 30 shown in the intermediate unit 18. The shorter containers 34 shown in the lower tier of the end unit 16 may be standard containers having a length 40 of 20 feet.

Figure 2:
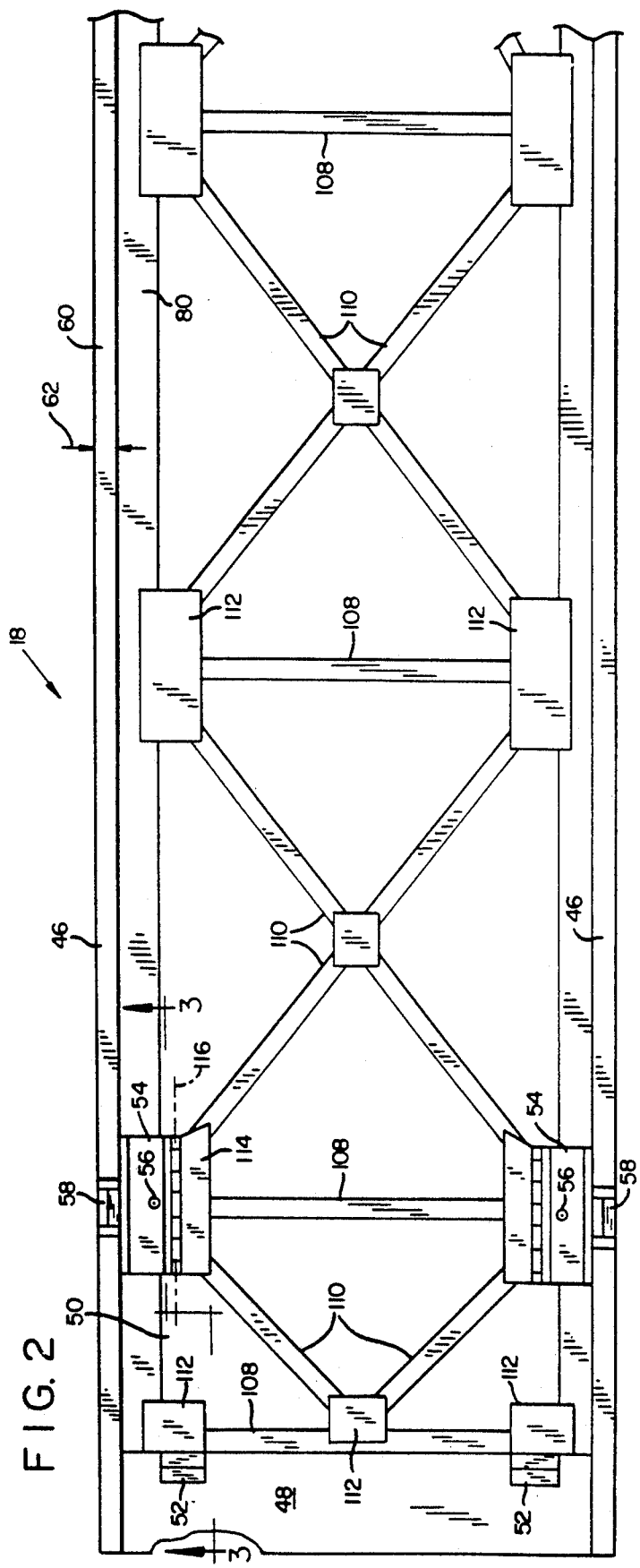
FIG. 2 is a top plan view, at an enlarged scale, of a portion of an intermediate unit of the articulated multi-unit freight car shown in FIG. 1.
Figure 3:
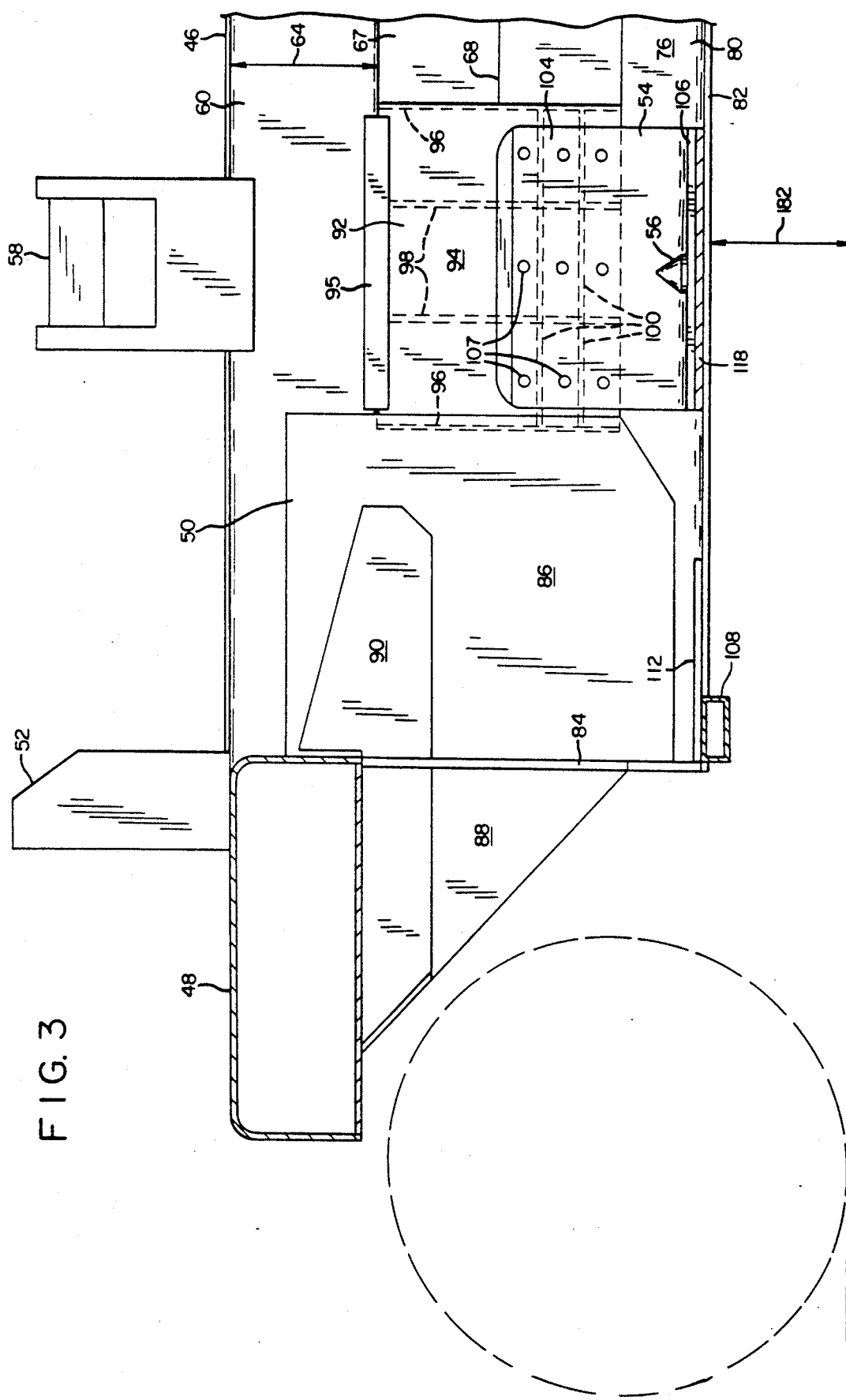
FIG. 3 is a sectional view, at an enlarged scale, taken along line 3—3 of FIG. 2, showing a side sill and a container support of an intermediate unit of the car shown in FIG. 1.
Figure 4:
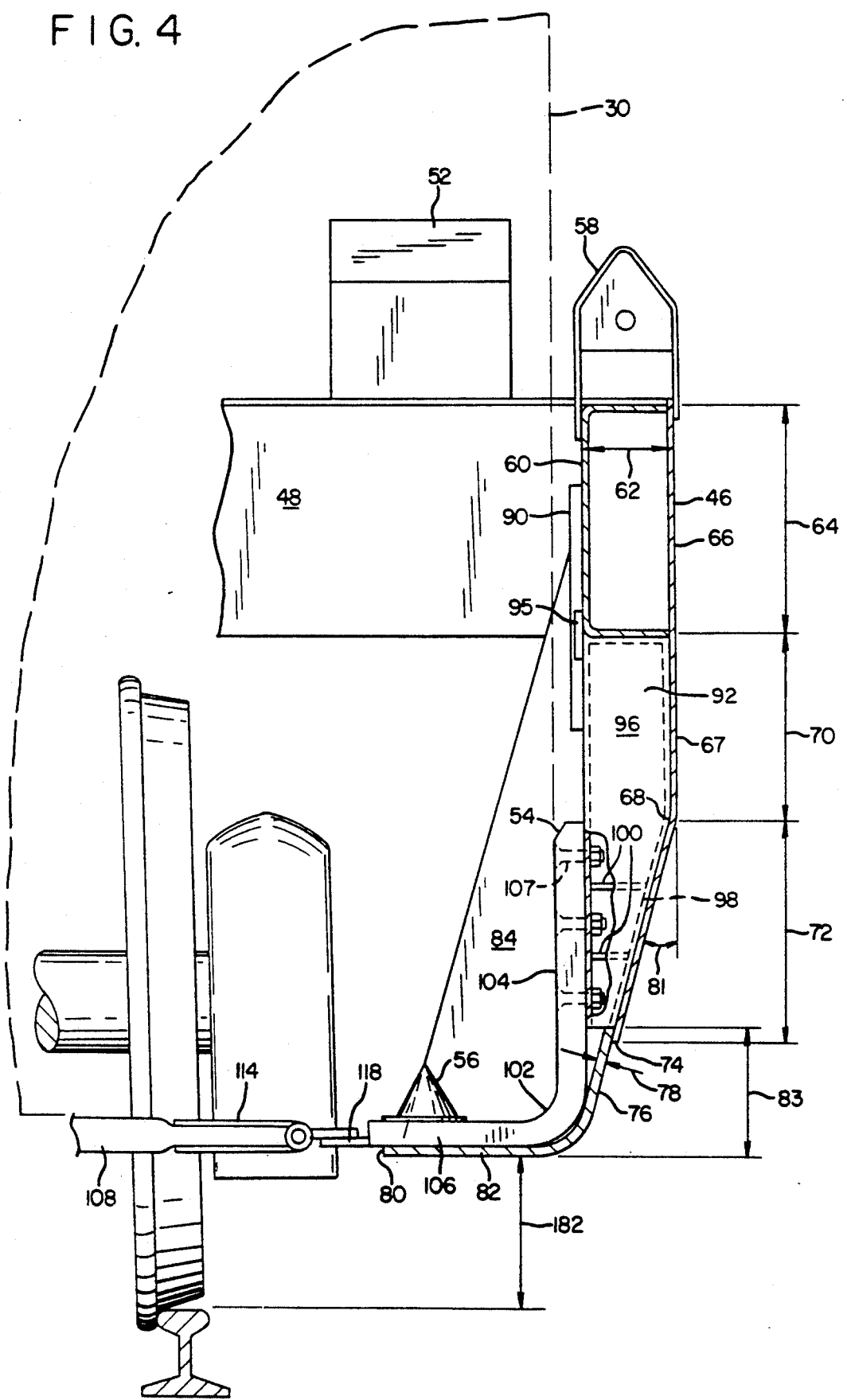
FIG. 4 is a sectional end elevational view of a portion of an intermediate unit of the multi-unit car shown in FIG. 1.
Figure 7:
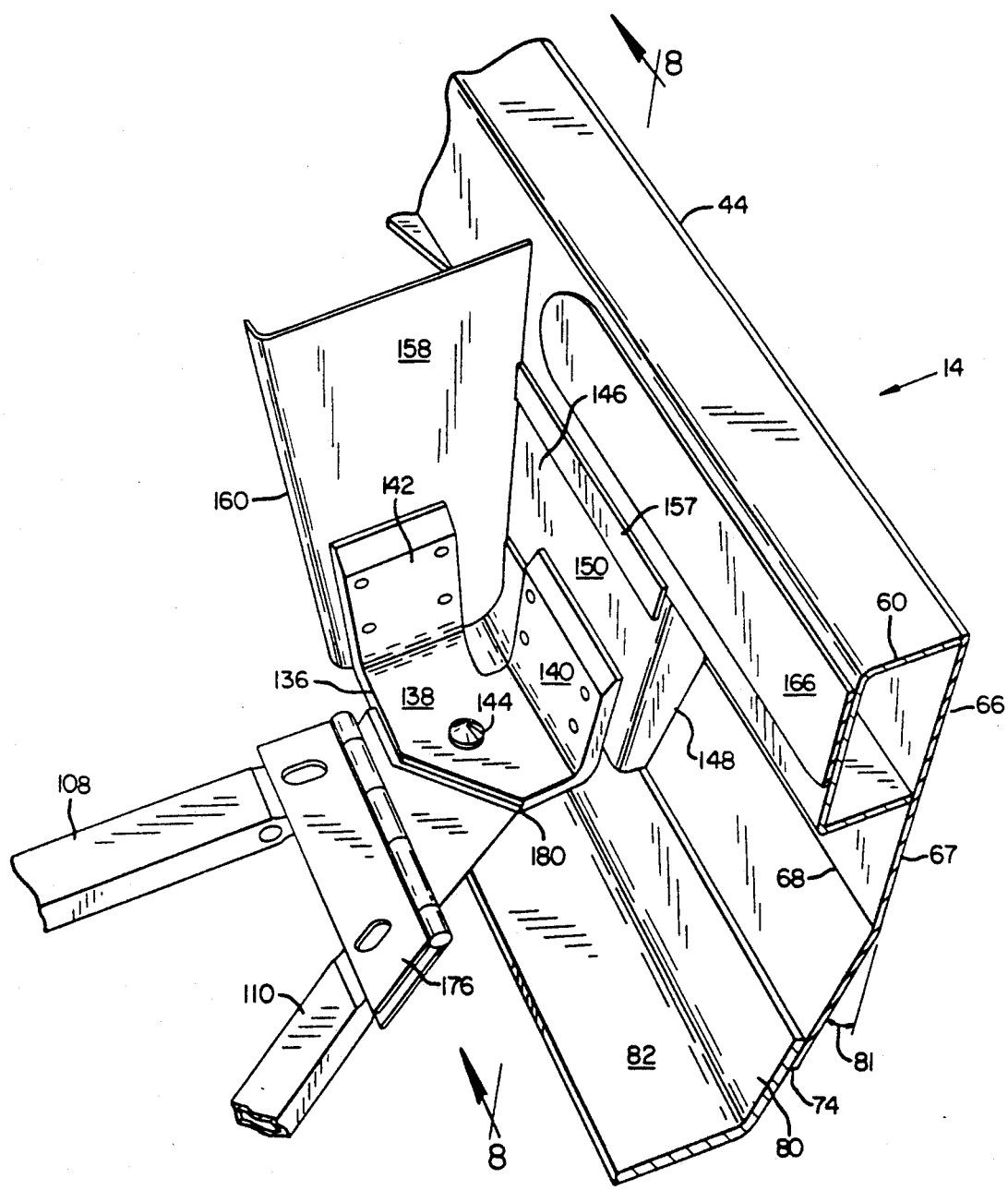
FIG. 7 is a perspective view, at an enlarged scale, of a portion of a coupler end of an end unit of the car shown in FIG. 1, showing a container support assembly.
Figure 8:
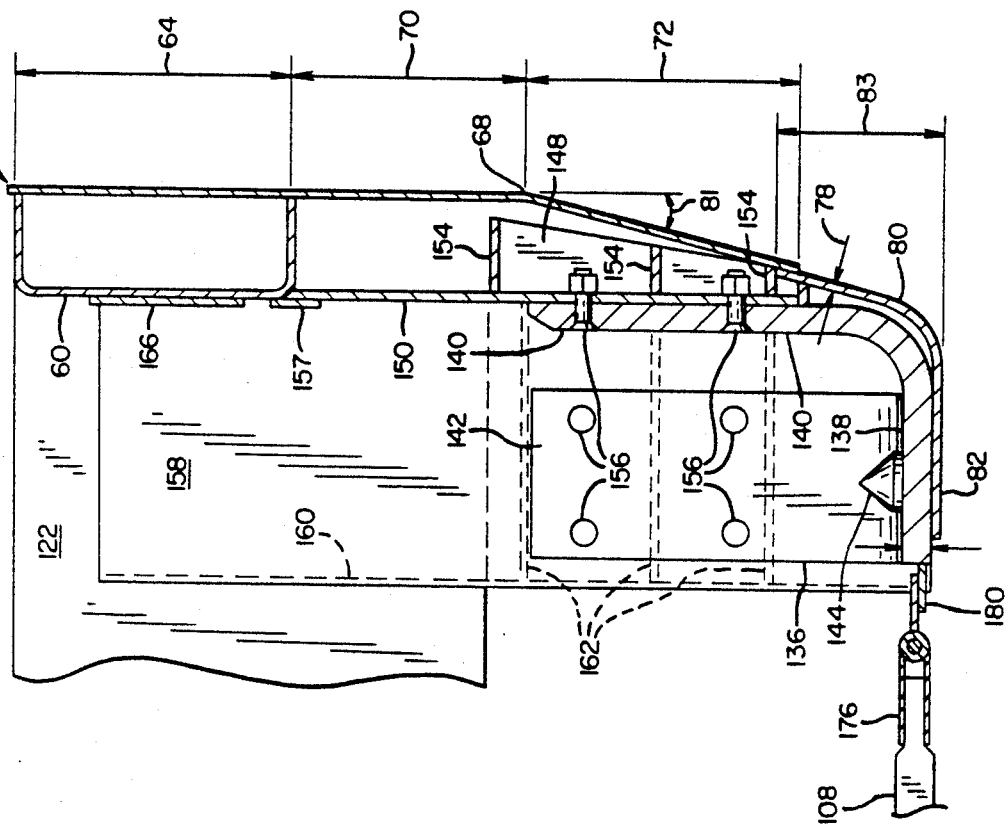
FIG. 8 is a sectional view of a portion of an end unit of the freight car shown in FIG. 1, taken along line 8—8 of FIG. 7.
Figure 9:
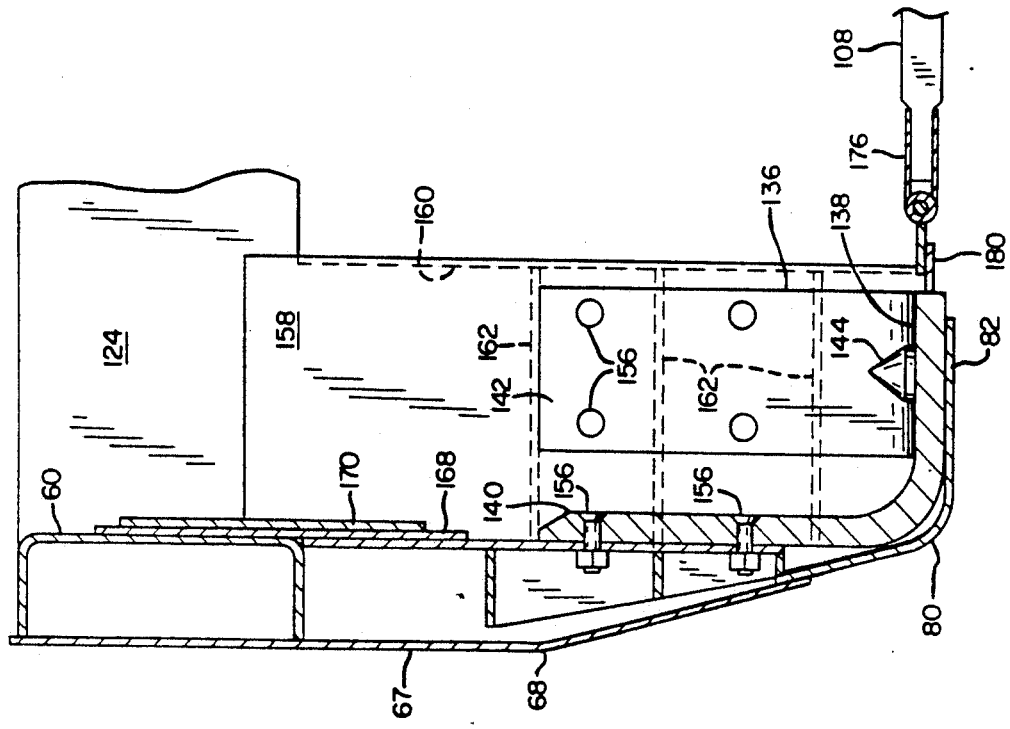
FIG. 9 is a sectional view, at an enlarged scale, of a portion of the end unit shown in FIGS. 5 and 6, taken along the line 9—9 of FIG. 5.
Figure 10:
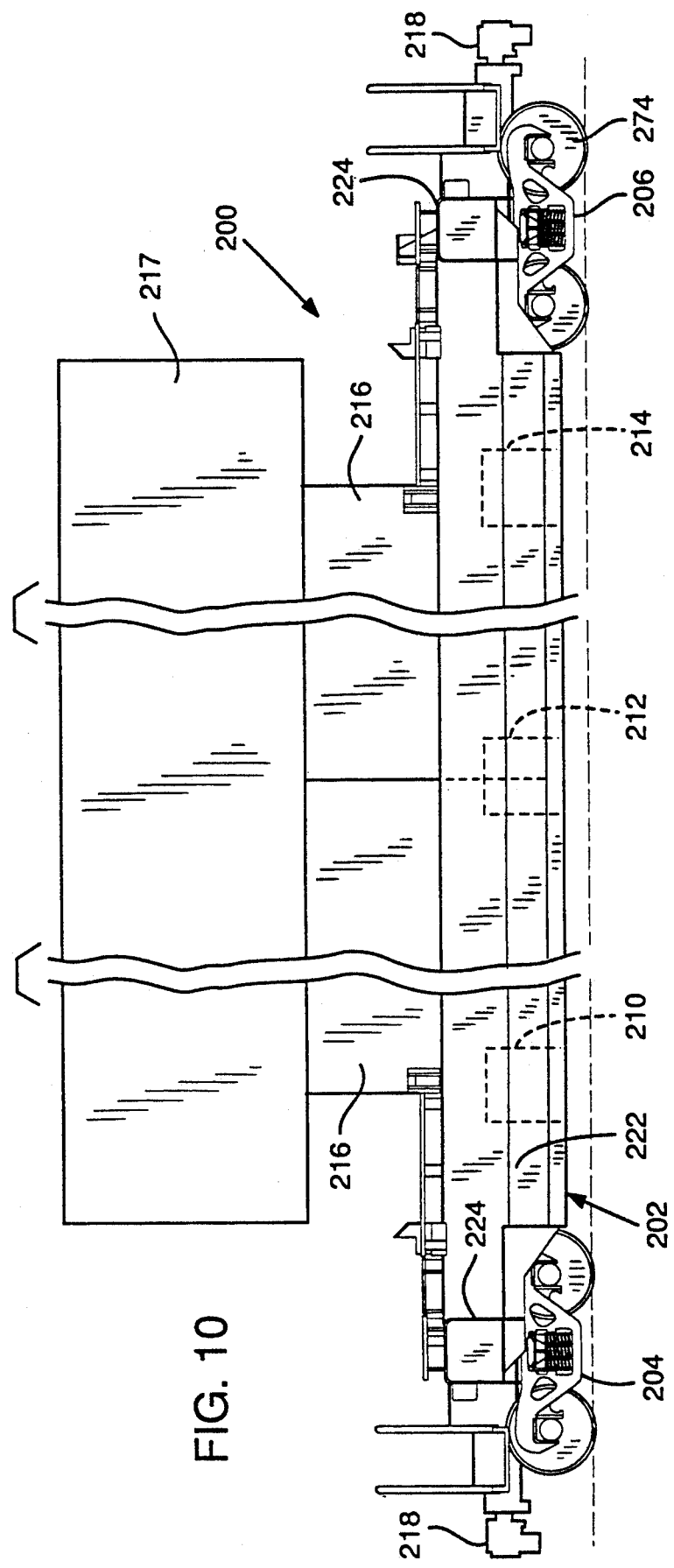
FIG. 10 is a side elevational view of a single-unit car according to the present invention, in which an unshared truck supports each end of the car.
Figure 11:
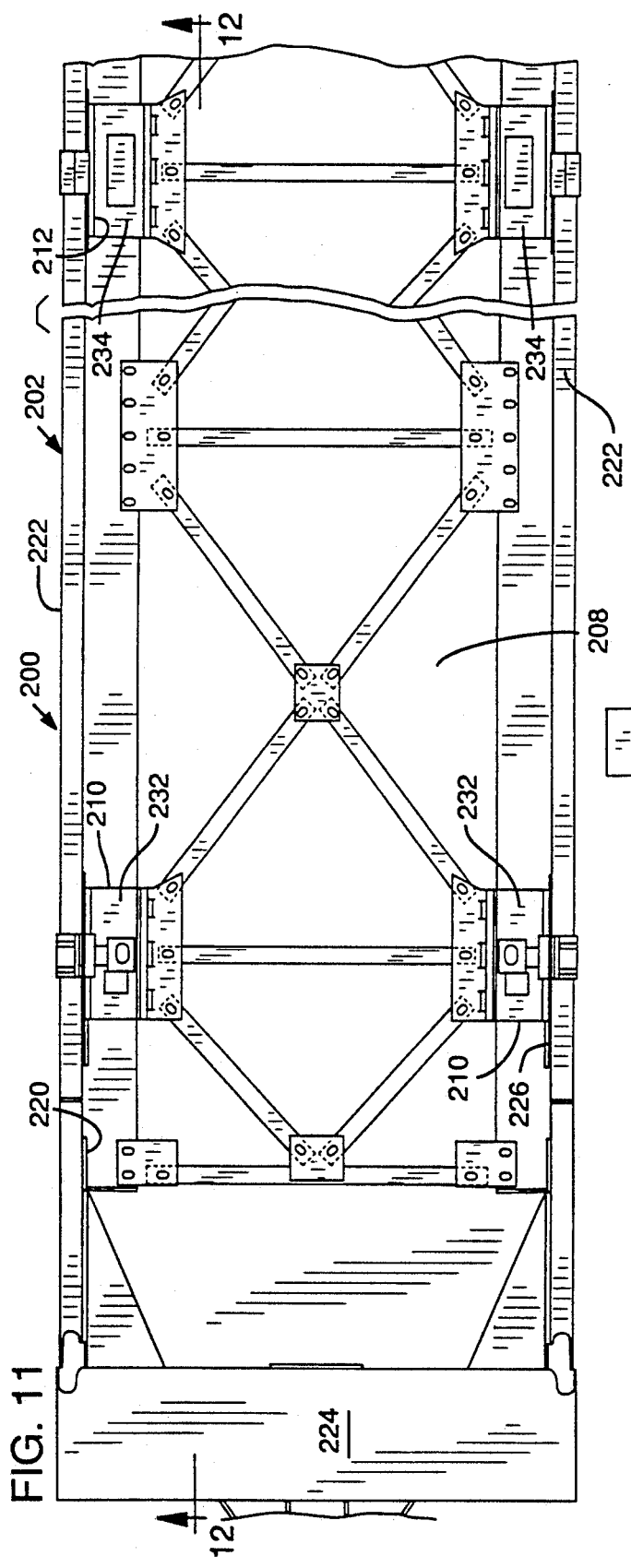
FIG. 11 is a foreshortened top plan view, at an enlarged scale, of a portion of the car shown in FIG. 10, without any cargo containers located in the container well thereof, at an enlarged scale.
Figure 12:
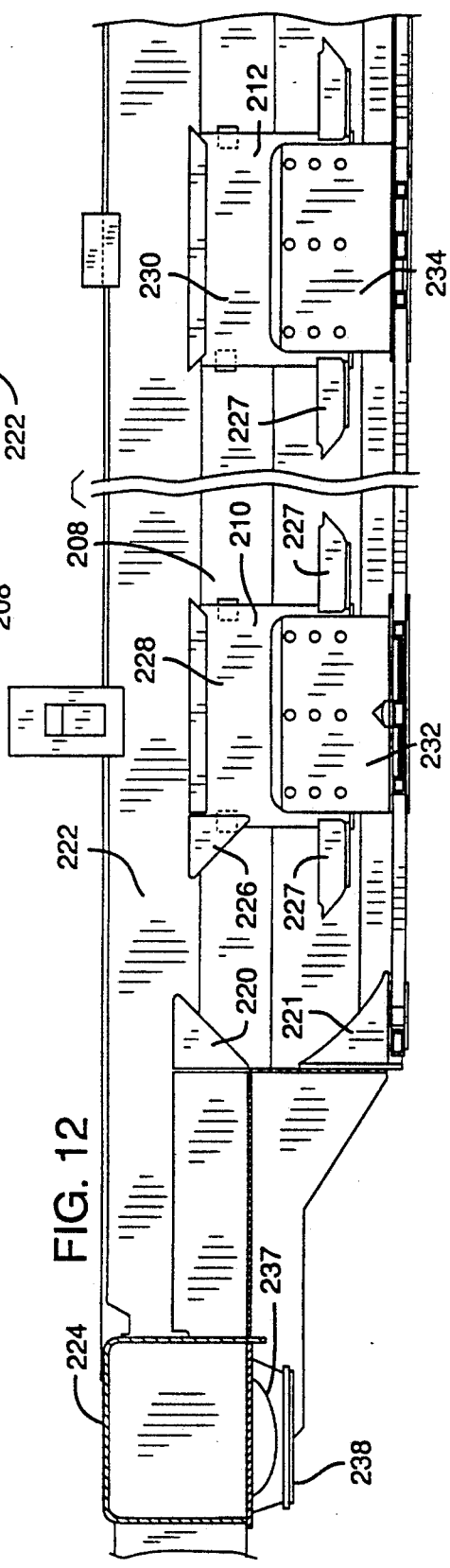
FIG. 12 is a foreshortened view taken along the line 12—12 of FIG. 11, showing a portion of the structure of the interior of the container well of the car, at an enlarged scale.

The car 12 is generally of welded steel construction, which will be understood as the means of interconnection of parts described, unless otherwise specified. Each of the end units 14 and 16 has a pair of side sills 44, and each of the intermediate units 18 has a pair of side sills 46. Referring now also to FIGS. 2, 3, and 4, about one-half of the length of an intermediate unit 18 is shown in top plan view in FIG. 2. A body bolster 48 extends transversely between the side sills 46 at each end of the intermediate unit 18, the two ends of which are generally similar, and a container well 50 is defined between the side sills 46 and the body bolsters 48, to receive a cargo container in a position as low as it can be carried. A pair of end container guides 52 are located on each of the body bolsters 48 and include sloping surfaces to guide a container such as the container 30 into the container well 50 during loading of the car unit 18.

The entire weight of the container 30, and additionally of any container such as the container 32 stacked atop the container 30, is carried by a pair of container support assemblies, each including a container support member 54, the main load support on which a container rests. The container support members 54 are located near each end of the car unit 18 and supported by attachment to the side sills 46. The container support assemblies are located, with respect to one another and to the container well 50, where the corner castings of 40-foot containers such as the container 28 will rest upon the container support members 54. The corresponding structural members in longer containers such as standard 45-foot containers or in 48-foot containers such as the container 30 or the container 32 will rest upon the container support members 54, each of which has mounted upon it a standard container locator cone 56.

Mounted atop each of the side sills 46 adjacent the respective ones of the container support assemblies are container guides 58 to guide containers laterally during loading into the container well 50. Preferably, the container guides 58 are adjustable to guide and provide lateral support for containers such as a standard 40-foot container 28, which are narrower than the 102-inch wide 48-foot container 30, although the particular design of such a guide 58 does not form a part of the present invention.

As may be seen most clearly in FIG. 4, each of the side sills 46 has a top chord including a top tube consisting preferably of a formed channel 60 having a pair of legs extending horizontally and laterally outward from the container well 50, with the vertical base or central section of the channel member 60 being significantly larger than the legs, so that the top tube has a width 62 and a top tube height 64 which is approximately 2½ times as great. A single web plate 67 of metal forms the outer wall 66 of the top tube, as well as serving as the web of the side sill 46, while the base or central portion of the channel 60 provides a flat vertical inner wall or side of the top tube. The web plate 67 continues downward vertically beyond the bottom of the channel 60 to a bend along a horizontal line indicated at 68 and thence extends diagonally downward and inward to a position beneath the channel 60 and about two-thirds of the way from the outer side 66 to the inner side of the top tube.

The distance 70 downward from the top tube to the bend 68, and the distance 72, from the bend 68 to the bottom margin 74 of the web plate 67 are preferably about equal, the distance 72 being somewhat greater to include a distance of overlap between the margin 74 and an upwardly directed leg 76 of a bottom chord member 80, which is a plate of metal having a thickness 78 which is significantly greater than the thickness of the web plate 67. For example, the distance 70 is about 123/16 inches, the distance 72 is about 14 inches, the top tube height 64 is about 149/16 inches, the top tube width 62 is about 511/16 inches, and the channel 60 and the web sheet 67 are both of steel plate ¼ inch thick, in one embodiment of the invention, in which the thickness 78 is ½ inch and the bend 68 defines an angle 81 of about 15° from planarity (FIG. 4). The upwardly extending leg 76 continues in the same direction as the portion of the web plate 67 below the bend 68, and thence is bent with a moderately large radius to extend inward as a horizontal leg 82 of the bottom chord member 80. The bottom chord 80 may thus have a height 83 of about 85/16 inches.

Both the bend 68 in the web plate 67 and the inward bend between the upwardly extending leg 76 and the horizontally extending leg 82 of the bottom chord 80 are preferably formed cold in the metal, while the legs of the channel 60 are welded to the outer wall 66 of the top tube, and the bottom margin 74 of the web plate 67 is welded to the bottom chord 80. This construction provides a lightweight yet stiff side sill 46 having three parallel longitudinal panels of light weight, including the outer side 66 of the top tube, with reinforcement provided in the top portion of the side sills 6 by the formed channel 60 and at the bottom by the relatively heavy plate bottom chord 80.

Additional rigidity is provided at each end by a vertical transverse gusset member 84, preferably of material of the same thickness as the web plate 67. For the same reason, a closure plate 86 extends vertically on the inner side of the channel 60 and extends downwardly to be connected by welding to the bottom chord 80, as may be seen best in FIG. 3. A gusset plate 88 and a doubler 90 reinforce the connection of the side sills 46 to the body bolsters 48 of the intermediate unit 18.

Each of the container support members 54 is connected to the respective side sill 46 by a hanger bracket assembly 92 of welded plate construction including a main plate 94 defining a vertical inner face and a pair of transverse vertical flange portions 96 formed by bending the plate. Vertical stiffeners 98 and horizontal stiffeners 100 are also welded to the outer side of the main plate, extending toward the web plate 67 of the side sill 46. Preferably, the main plate 94 and the vertical stiffeners 98 are at least as thick as the web sheet 67, and the horizontal stiffeners 100 are thicker.

The container support members 54 are of relatively very heavy steel plate material, at least about one inch thick, for example being 1⅛ inches thick, and are bent at 102 with a radius of curvature of the inner surface of about three inches (4⅛ inches for the outside surface), without heating the metal, to form an upwardly directed vertical leg 104 and a horizontal foot portion 106. Chamfered holes are formed and mechanical fasteners 107 having countersunk heads are inserted through the holes and through corresponding holes provided in the main sheet of the hanger bracket assembly 92 to fasten the vertical leg 104 of the container support member 54 to the hanger bracket assembly 92, so as to avoid the disadvantages, such as the weakening of portions of the metal, which might occur as the result of fastening the container support member 54 to the hanger bracket assembly 92 by a welded joint. The fasteners 107 may be threaded fasteners, rivets, or lock bolts having annular grooves and to which a nut is swaged with the bolt under tension. Such fasteners should at least meet the requirements of ASTM A325.

Preferably, the container support member 54 is of a high strength steel which will include residual internal stresses as a result of the cold bending process. These residual internal stresses will include residual compression stresses on the inside of the bend portion and residual tension stresses on the outside of the bend portion defining the horizontal foot portion 106 and the vertical leg 104. These residual internal stresses will provide resistance to fatigue cracking and early failure of the container support members 54. A preferred material for the container support members 54 is a low carbon age hardening alloy steel according to ASTM specification A710 Grade C, Class 3 Modified, having 90,000 psi tensile strength and 80,000 psi yield point, which is available, for example, from Oregon Steel Mills of Portland, OR.

After the container support member 54 is fastened to the respective bracket assembly 92, the hanger bracket assembly 92 is welded to the side sill 46, along the vertical transverse flange portions of the main plate of the hanger assembly 92 and along the bottom of the top tube, where a narrow bridging plate 95 connects the upper margin of the main plate 94 to the inner face of the channel member 60, with the horizontal foot 106 of the container support member 54 adjacent the top surface of the horizontal leg 82 of the bottom chord member 80. As may be seen in FIGS. 2 and 3, the container support member 54 extends longitudinally of the car a sufficient distance to provide the necessary load carrying capacity to carry the expected loads imposed by the weight of the containers 30 and 32 and their contents, together with the dynamic stresses imposed by such factors as crosswind, uneven track, track curvature and centrifugal force, and harmonic motion of the car during operation.

Referring particularly to FIGS. 2 and 4, a truss structure including a plurality of transverse members 108 and diagonal members 110 is provided to stiffen the car unit 18. The truss structure interconnects the opposite bottom chord members 80 at several places where attachment plates 112 are welded to the bottom chords 80, and also interconnects each container support member 54 with the laterally opposite one and with the portions of the truss structure fastened to the bottom chords 80. This serves to support the side sills 46 against buckling under the various loads to which they may be subjected during operation of the car 12. The truss members 108 and 110 also would be able to serve to support part of the lading of a container 30 carried in the car unit 18, should the floor of the container fail. Further, the horizontal leg 82 of the bottom chord 80 (FIG. 4) is sufficiently wide to assist in supporting lading in the case of a container floor failure.

At the positions along the side sills 46 where the container support members 54 and their hanger brackets 92 are located the truss members 108 and 110 are attached by welding to one side 114 of a hinge having an axis of rotation 116 extending horizontally and longitudinally of the car unit 18, while the other side of the hinge is connected to the horizontal foot 106 by being welded to an attachment plate 118 which is welded to the margin of the container support member 54. The truss members 108 and 110 preferably are constructed of rectangular tubular stock with end portions of the truss members 108 and 110 crushed to occupy a smaller height where they are welded to the attachment plates 112 and hinge sides 114.

As a result, the container support members 54 will subject the transverse truss member 108 and diagonal truss members 110 connected to the side portion 114 of the hinge substantially only to tension stresses and not to bending stresses, resulting from loads imposed on the container support member 54 by cargo containers carried in the car unit 18. The horizontal foot 106 of each container support member 54 will thus be able to be deflected downwardly as the container support member 54 flexes, without causing the connection of the truss members to the container support member 54 to fail. Downward deflection of the container support members 54 will also bring them downward into contact with the top surface of the horizontal leg 82 of the bottom chord 80, which will then absorb a portion of the forces exerted downwardly on the container support member 54.

The end units 14 and 16 include shorter container wells than the container well 50 of the intermediate unit 18, because of the need to have an end platform, a complete truck, and a coupler at each end of the multi-unit car 12, and because of the need to have the spacing between truck centers short enough not to unduly limit the maximum width of the car units 14 and 6. The units 14 and 16 are basically identical, except for the location of safety appliances which do not form a part of the present invention, and therefore only the unit 14 is shown in detail in the drawings. As shown in FIGS. 5 and 6, a container well 120 is defined between the side sills 44, which are interconnected by a coupler end body bolster 122 and a body bolster 124 at the opposite end of the car unit 14, which is coupled through an articulating coupling and a truck shared jointly by the car unit 14 and the adjacent intermediate unit 18.

Except for a somewhat shorter length and details of connection to the body bolsters 122 and 124, the side sills 44 are generally similar in construction to the side sills 46 previously described as part of the intermediate unit 18, and will not be described in detail. The corresponding components of the side sills 44 are labeled in the drawings using the same reference numerals as those used in connection with the previous description of the side sills 46.

Since the end units 14 and 16 are intended to be able to carry a pair of cargo containers 34, each 20 feet long, a container support member 126, generally similar to the container support members 54, is provided at midlength of the container well 120. The channel member 60 may be of 5/16 inch plate, and the bottom chord 80 of 9/16 inch plate in the end units 14, 16 to support the resulting mid-span loading of the side sills 44. A container hanger bracket assembly 128 is welded to the top tube channel 60 and web plate 67 after the support member 126 has been fastened to it by mechanical fasteners 130. The structure of the hanger bracket assembly 128 is similar to that of the hanger bracket assembly 92, except that there need not be horizontal stiffeners corresponding to the stiffeners 100 in the hanger bracket assembly 92, although there are vertical stiffeners 132 and flanges 134 which act as vertical stiffeners. Also, because of the lighter loads expected to be supported by the container support member 126, fewer mechanical fasteners 130 are required than the number of mechanical fasteners 107 used for the container support members 54 of the intermediate units 18, and lighter material, for example 1⅛ inch plate steel of the same type used for the container support members 54, may be used as the container support member 126, also bent to an inside surface radius of curvature of about three inches, without heating. As with the hanger bracket assemblies 92, attachment of the hanger bracket assemblies 128 to the channel member 60 includes the use of a narrow bridging plate 134 extending from the vertical inner side of the channel 60 to the vertical inner surface of the hanger bracket assembly 128.

A container corner support member 136 defines each of the four corners of the container well 120, and is constructed of the same sort of heavy plate material as used for the container support members 54, cut and bent without heating with a radius of curvature of two inches for the inside surface (and 3½ inches for the outer surface), to include a horizontal bottom portion or foot 138 and a pair of upstanding leg portions, a side portion 140 and an end portion 142. It will be recognized that the container support members 136 will necessarily be provided in pairs of opposite hand, but otherwise are similar. A container locating cone 144 is provided on the horizontal bottom portion 138 of each of the container support members 136.

The upstanding side portion 140 of each of the corner support members 136 is attached to the side sill 44 by a hanger bracket assembly 146. A single flange 148 is perpendicular to the main plate 150 of the hanger bracket assembly 146, facing away from the container well 120, and a vertical stiffener 152 and three horizontal stiffeners 154 are welded to the main plate 150, also extending away from the container well 120. Four mechanical fasteners 156, which may also be similar to the mechanical fasteners 107 of the container support members 54, are used to attach the vertical side portion 140 to the hanger bracket assembly 146. A narrow bridge plate 157 is used to connect the main plate 150 of the hanger bracket assembly 146 to the channel member 60 by welding, and the flange 148 is welded to the web portion 67 of the side sill 44.

A pair of end hanger brackets 158, of right and left hand, are provided at the coupler end of each of the end units 14 and 16, and extend generally transversely and vertically, each having a respective flange 160 and horizontal stiffeners 162 directed away from the interior of the container well 120. The vertical end portion 142 of the container corner support member 136 is fastened to the end hanger bracket 158 by mechanical fasteners 156, and the end hanger bracket 158 is attached by welding to the channel portion 60, to the adjacent main plate 150 of the hanger bracket assembly 146, and to the interior side of the side sill 44.

The hanger bracket assembly 146 and the end hanger bracket assembly 158 are positioned with respect to the side sill 44 so that the horizontal bottom portion 138 is located closely atop the horizontal leg 82 of the bottom chord member 80 of the side sill 44 as discussed previously in describing attachment of the container support members 54.

At the opposite end of the end units 14 and 16 a pair of end hanger bracket assemblies 164, of opposite hands, are provided. The end hanger bracket assemblies 164 are generally similar to the end hanger brackets 158, except that the vertical flange portion 160 of each hanger bracket assembly 164 is welded to the bottom of the body bolster 124 and the top margin of the main plate of the hanger bracket assembly 164 is welded to the vertical face of the body bolster 124, extending only to a lesser height than that of the end hanger brackets 158.

A doubler plate 166 is provided on the vertical inner side of the channel member 60 above each hanger bracket assembly 146 at the coupler end of the unit 14. Reinforcing plates 168 and 170 and a gusset 172 are provided on each side at the opposite, intermediate end of the end unit 14 to provide adequate strength in the area of the connection of the side sills 44 to the body bolster 124.

As shown best in FIG. 6, a truss structure interconnecting the bottom chords 80 and similar to that described in connection with the intermediate unit 18 is provided in each of the end units 14 and 16. The truss structure includes a plurality of transverse members 108 and diagonal members 110 which serve the same purpose described in connection with the truss structure of the intermediate unit 18. Except at the locations of the container corner support members 136 and container support members 126, attachment of the truss structure members 108 and 110 to the bottom chord members 80 is accomplished by attachment plates 112 as in the intermediate units 18. Attachment of the truss members 108 and 110 to the container support members 126 and container corner support members 136 is accomplished by the use of hinges 174 and 176, respectively, which define hinge pivot axes extending horizontally and longitudinally of the unit 14 or 16 in order to function in substantially the same manner as the hinges 114. The hinges 174 are attached to the container support members 126 by respective hinge attachment plates 178 welded to the margin of the container support member 126, and the hinges 176 are fastened to the container corner support members 136 by hinge attachment plates 180 welded to the respective margins of the horizontal bottom portion 138 of the container corner support member 136. Attachment of the truss structure to the container support members 126, 136 in this manner is accomplished for the reasons discussed previously in connection with the container support members 54.

Preferably, a car 12 will include end units 14 and 16 and three intermediate units 18, utilizing end trucks 22 of 70-ton design and intermediate trucks 24 of 125-ton design and will safely accommodate loaded cargo containers of the sizes described hereinabove, providing an ample clearance distance 182 (FIG. 4), beneath the loaded car 12 and on each side, and without exceeding the maximum height limitations of the major rail lines, as a result of the high strength of the container support members 54, 126, and 136 in combination with the light but strong design of the side sills 44 and 46, as supported by the truss structure interconnecting the bottom chord members 80 of the side sills of the several units of the car 12.

While it would be possible to provide container support members similar to the container support members 126 at mid-length of the intermediate units 18 to permit carriage of a pair of shorter containers such as standard 20' or 24' containers in the container well 50, the additional weight which would result from strengthening the side sills 46 to support loading at such a location, in view of the greater length of the side sills 46, would detract from the freight-earning cargo capacity of the car because of current limitations on the maximum loading which can be imposed on the railroad tracks, and would therefore be uneconomical.

It will be understood that a single unit having a pair of couplers 20 and a pair of trucks such as the trucks 22 may also be provided utilizing the structure of the present invention. It will also be understood that the car 12 may be constructed with shorter end units 14, 16 and intermediate units 18, if desired, for carriage of special containers of unusually dense lading.

A single-unit railway freight car 200, which is another embodiment of the invention, is shown in FIGS. 10–14, and includes a car body 202 supported by a pair of similar trucks 204, 206, each supporting a respective end of the body 202. The car body 202 defines a container well 208, seen best in FIG. 11, and which is generally similar to the container well 50 described in connection with the car 12. Container support assemblies 210, 212, and 214, similar in most respects to the container support assemblies of the car unit 18, are provided within the container well 208 which can receive a single long container (not shown) or a pair of shorter containers 216 arranged end-to-end, as in the container well 120 of the car 12, while a single longer container 217 can be carried atop a long container or the pair of shorter containers 216 located in the container well 208.

Conventional couplers 218 are located at each end of the car body 202, although a unit train of similar single-unit cars 200 could be made up using more permanent couplings such as draw bars (not shown).

The container well 208 is generally similar to the container well 50 of the car unit 18 described hereinabove in connection with the multi-unit car 12, and will therefore not be described hereinbelow in great detail. However, it should be noted that in a preferred embodiment of the invention additional gussets 220, 221 may be used to strengthen the interconnection between the side sills 222 and the body bolsters 224. It should also be noted that triangular, horizontal bracing assemblies 226 are also provided, extending horizontally forward and rearwardly from each of the hanger bracket assemblies 228, 230.

The side sills 222 are substantially similar to the side sills 46 of one of the end units 14, but in the single-unit car 200, whose container well 208 is long enough to receive containers longer than the standard 40' container, the container support assemblies 210 and 214 are similar to the container support assemblies located near each end of the intermediate car unit 18 of the multi-unit car 12 described hereinabove, and are located spaced apart from the body bolsters 224. In a single-unit car 200 such as the one shown in FIGS. 10–14, in which the container well 208 is of a great enough length to receive a standard 48' cargo container, but also includes the centrally located container support assemblies 212, allowing two short containers to be carried end-to-end in the container well 208, the side sills 222 are constructed of correspondingly thicker plate or of a stronger alloy, to provide sufficient additional strength to support the resulting greater vertical loads.

The container support assemblies 210, 212 and 214 include container support members 232, 234 substantially similar to the container support members 54 described in greater detail in connection with the multi-unit car 12. Similarly, the container support members 232, 234 are interconnected with one another by a truss structure similar to the truss structure described hereinabove in connection with the multi-unit car 12, and corresponding members thereof are designated by like reference numerals. For a shorter single-unit car, it would be possible to use construction of the ends of the container well similar to that shown in FIGS. 5, 6, 7, 8 and 9 in connection with the end unit 14 of the multi-unit car 12 described previously.

The trucks 204 and 206 supporting the body 202 of the single-unit car 200 may each be 70-ton trucks, since neither of the trucks 204 and 206 is shared by an adjacent car unit. A respective body bolster 224 at each end of the car body 202 extends between the side sills 222 and is connected to the respective truck 204 or 206 by a center bearing 237 through which most of the weight of the car body 202 and its lading are carried. The center bearing 237 also establishes a vertical axis, or truck center, for each of the trucks 204, 206 about which the truck rotates relative to the body bolster 224 to negotiate curved track. The truck centers are separated by a distance 239 of about 57 feet in the car 200, which is considerably greater than the 39-foot normal rail section length, so that passage of the two trucks 204, 206 over a rail joint will not set up a resonant rolling motion as the car proceeds along the track at a normal speed. While every car has a critical speed, dependent on its mass, the height of its center of gravity, the spring rate and amount of damping in its suspension, and other dimensional factors, it is considered that for a single-unit car such as the car 200 carrying containers stacked in two tiers it is critical to have at least 50 feet between truck centers to avoid excessive resonant lateral rocking about a longitudinal axis.

Side bearing foundations 238, 240 extend longitudinally of the car on the underside of the body bolsters 224 at positions spaced laterally apart from the center bearing and are provided with wear plates 242 attached by countersunk bolts 244. Shims 246 may be provided to adjust the position of the side bearing wear plates 242 as necessary.

Figure 13:
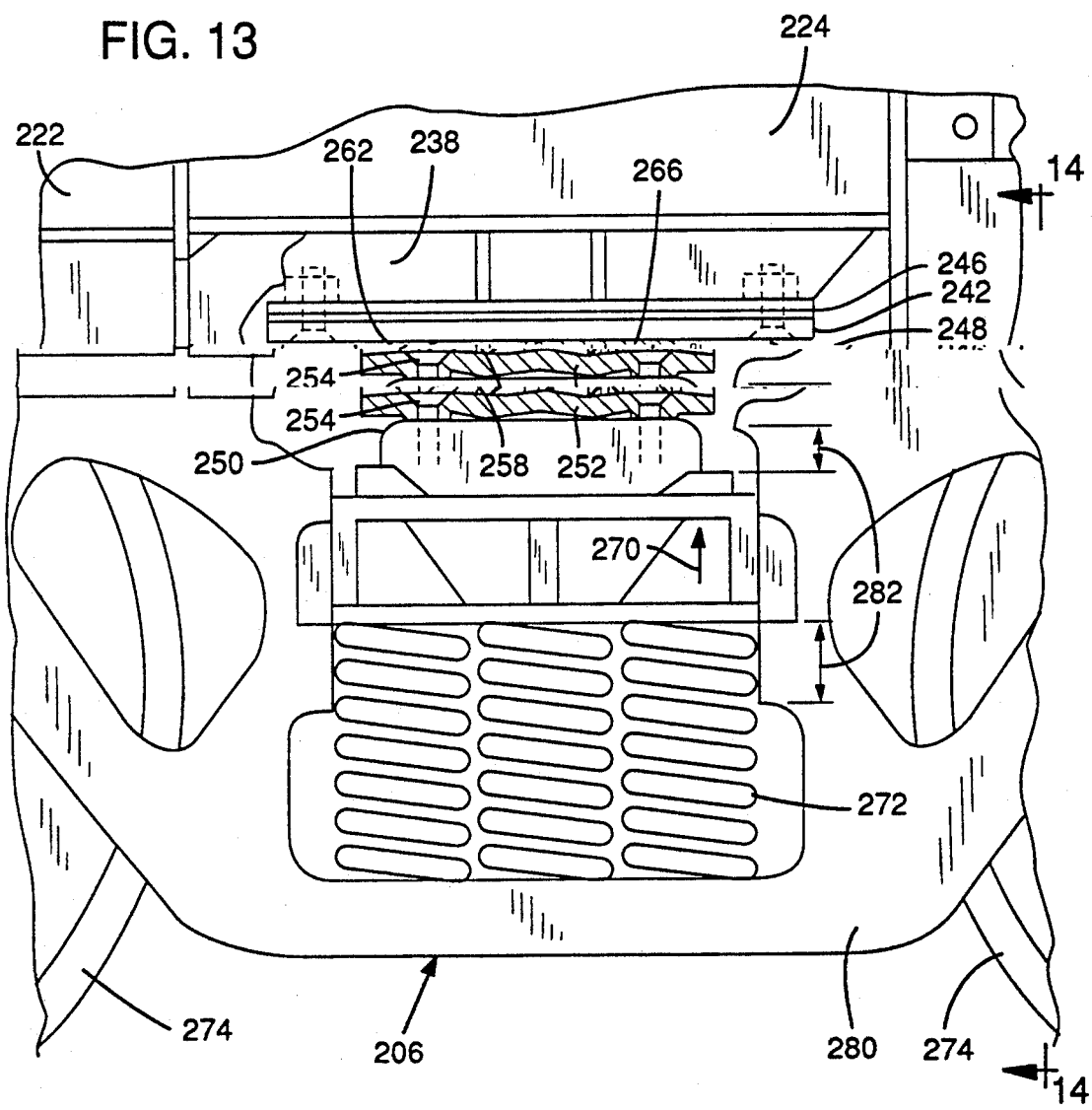
FIG. 13 is a side elevational view, at an enlarged scale, of one of the trucks and a portion of the body of the car shown in FIG. 10, partially cut away to show one of the side bearings.
Figure 14:
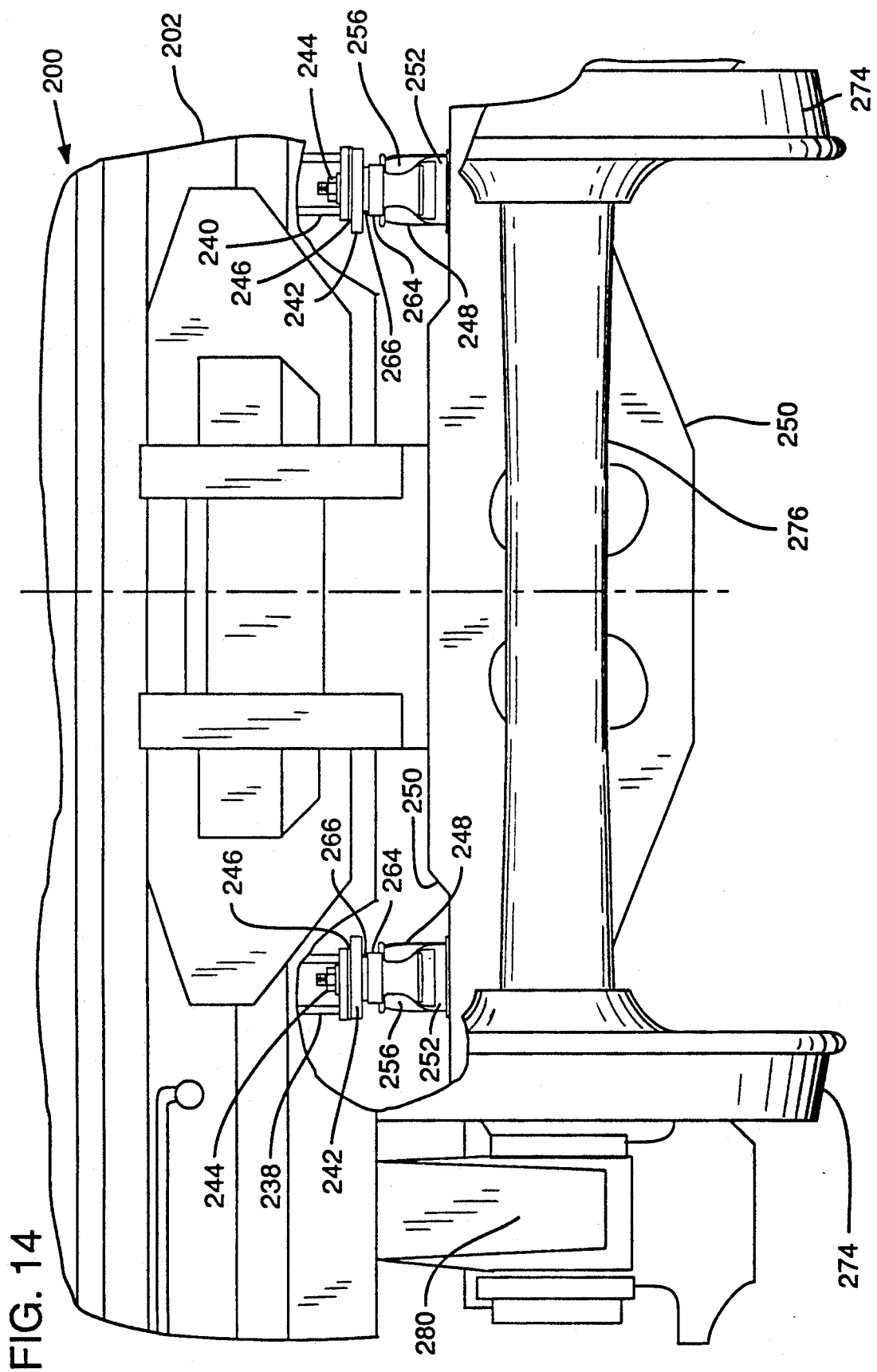
FIG. 14 is a partially cut-away end view of a portion of the car of FIGS. 9-12, including the truck shown in FIG. 13, showing the location of the side bearings between the truck and the body of the car.

Side bearings 248 are carried atop the truck bolster 250, the main transverse member of each truck 204 and 206 and provide constant frictional contact with the side bearing plates 242. Preferably, the side bearings 248 are of the roller-assisted, constant-contact type such as the type ISB-8 roller-assisted constant-contact side bearing available from the A. Stucki Company of Pittsburgh, PA. As shown in FIGS. 13 and 14, such a side bearing 248 includes a base 252 fastened to the truck bolster 250 by fasteners such as countersunk bolts 254. An upstanding retainer wall 256 holds a roller path member 258, and a generally cylindrical roller 260 rests upon the roller path member 258, normally leaving a space 262 of about $\frac{1}{4}$ inch between the roller 260 and the upwardly adjacent side bearing wear plate 242.

Also held in the space defined by the retainer wall 256 is a resilient body 264, which may be molded of an appropriate rubber-like plastics material. The resilient body 264 receives and retains a wearing body 266 which may be cast of a suitable metal. The resilient body 264 elastically provides a force against the wearing body 266, holding it constantly in contact with the surface of the side bearing wear plate 242, thus always providing some frictional resistance to rotation of the truck about the vertical axis of its center bearing 237, since such rotation of the truck, turning the wheels relative to the length of the body 202, always results in movement of the side bearing 248 with respect to the side bearing foundation 238.

When the car 200 is on level track in an evenly loaded condition, the wearing body 266 of the side bearing 248 located on each side of each of the trucks 204, 206 is thus held in contact with the respective side bearing wear plate 242, and each roller 260 is idle, spaced apart from the respective wear plate.

When uneven lading of the car, or a change in the amount of superelevation of one rail of the track between the location of the truck 204 the location of the truck 206 raises one end of the transverse member 250 of one of the trucks with respect to the adjacent end of the car body 202, as indicated by the arrow 270, a small amount of movement of the truck bolster 250 in the direction indicated by the arrow 270 causes the resilient body 264 to be resiliently deformed. When the side bearing wear plate 242 comes into contact with the roller 260 it prevents the side bearing 248 and the transverse truck bolster 250 from moving further toward the side bearing wear plate 242. The roller 260 limits the amount of frictional resistance to turning, and permits the truck 204 to rotate about its center bearing with respect to the body 202 of the car 200, since further pressure of the side bearing arm 238 downward toward the respective end of the truck bolster 250 is carried by the roller 260 and roller path member 258, with only a limited amount of sliding friction generated between the wearing body 266 and the side bearing wear plate 242.

On the other hand, as a result of the friction always generated by the resilient bodies 264 pressing the respective wearing bodies 266 against the side bearing wear plates 242, the trucks 204, 206 are not free to "hunt" or wander freely by rotating about the vertical axes extending through the center bearing of the trucks. The amount of friction which needs to be overcome in order to allow the truck 204 or 206 with respect to the body 202, however, is not so great that the truck might be derailed rather than being able to turn in response to curvature of the tracks on which it is moving.

Another aspect of the present invention which makes it practical to construct a single-unit car 200 defining a container well is the use of softer springs 272 with a greater range of travel of the transverse truck bolster member 250 of the trucks 204, 206 than is customary in rail cars. Each truck 204, 206 has a pair of wheels 274 on each of a pair of axles 276, and the transverse truck bolster 250 is free to move vertically with respect to the side members 280 of each truck 204 within the limits established by the side members 280 and the available range 282 for movement, between the free height and fully compressed condition of the coil springs 272.

Accordingly, the coil springs 272 in each side of each of the trucks 204, 206 may be of the American Association of Railroads type D-7, for a car equipped with 70-ton trucks and having a maximum gross weight when laden of about 220,000 pounds. Such type D-7 coil spring sets 272 provide a range of compression of about 4¼ inches from relaxed free height to fully compressed condition, which is about 9/16 inch greater range of movement than is available in the stiffer type D-5 springs ordinarily used for freight cars. This is about a 15% potential increase in range of travel, depending upon the available range of movement of the truck bolster 250, dictated by the design of the trucks 204, 206. The preferred 70-ton trucks 204, 206 equipped with D-7 springs have a reserve travel, the nominal remaining distance by which the springs can be compressed when the car 200 is fully loaded, of 1.67 inch, as compared to 1.4 inch for the similar 70-ton truck with D-5 springs, for about 19% greater movement possible to accommodate track irregularities and transitions from level track to curved track with superelevation of one rail, thus reducing the strain being imposed on the car body 202 by a particular vertical variation of track heights from a planar arrangement.

Additionally, the D-7 springs have about a 10% lower spring rate than that of the D-5 springs normally used for a freight car so that the trucks 204, 206 are more compliant to differences between the relative heights of the rails at the locations of the trucks 204, 206. In terms of spring rate of the car 200 taken as a whole, the spring supported portion of the 220,000-pound gross rail load maximum designed to be carried by two 70-ton trucks is about 205,900 pounds, and the total spring rate for the combination of all of the springs of both trucks 204, 206 equipped with D-7 spring sets is nominally 80,480 lb/in, or about 0.391 car mass/inch, as compared to about 0.436 car mass/inch with conventional D-5 springs, only about 89.7% as much force thus being required to compress a given spring set of the car 202 a given distance, by comparison with the normal suspension of a freight car with 70-ton trucks. Accordingly, the difference between the amounts of weight transferred to the track through the wheels 274 at opposite ends of a given axle 276 is reduced, reducing the tendency of a truck 204, 206 to be derailed. Thus, under certain circumstances springs such as the D-7 springs, with a lower spring rate and used on a truck allowing longer travel, have the advantage that the vertical forces applied to the rails by the wheels are more equally distributed between all the various wheels on the car 200. Accordingly, it is felt that a spring rate of no greater than about 0.400 car mass/inch is preferred in such single-unit well cars for stacked cargo containers. This helps decrease the chances of derailment because, inevitably, when some of the wheels carry higher vertical forces others carry lower vertical forces and are more likely to derail. Thus, the better distribution of weight is important, particularly on a curved portion of a track, and particularly where the longitudinal separation between trucks is greater.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A railroad freight car having a single car body defining a well for receiving and carrying intermodal cargo containers, comprising:
   (a) a pair of transversely extending body bolsters located at respective opposite ends of said body;
   (b) a pair of side sills extending longitudinally of the car and attached respectively to said body bolsters, each of said side sills being of lightweight construction including
      (i) a deep top tube portion of rectangular shape extending continuously between said pair of body bolsters;
      (ii) a web plate depending from said top tube portion, said web plate including a longitudinally extending upper portion and a longitudinally extending lower portion defined by a longitudinally extending bend in said web plate; and
      (iii) a bottom chord welded to said lower portion of said web plate and made of material of a significantly greater thickness than that of said web plate, said bottom chord including an upwardly directed portion and a generally horizontal portion interconnected by a bend extending horizontally and longitudinally of the car, said lower portion of said bottom chord extending laterally inward of the car, said deep top tube portion having an outer side, an inner side, a top, and a bottom, and defining a top tube depth, said upper portion of said web plate extending downward as a coplanar extension of said outer side for a distance approximately equal to said top tube depth and said lower portion of said web plate extending diagonally downward and inward from said upper portion, said lower portion of said web plate having a height approximately equal to said top tube depth and having a bottom margin located substantially beneath said top tube, and said upwardly directed portion of said bottom chord overlapping said bottom margin of said lower portion of said web plate and being welded thereto; and (c) two unshared trucks supporting said car body, located at respective opposite ends of said body.

2. The railroad freight car of claim 1, further including a pair of roller-assisted constant-contact side bearings associated with each of said trucks for supporting said car body and providing a limited amount of frictional resistance to rotation of each of said trucks with respect to said car body about a respective vertical axis of rotation.

3. The railroad freight car of claim 1 wherein said car exerts a gross rail load including a spring-borne portion thereof and wherein each of said two unshared trucks is equipped with springs which provide a vertical reserve travel of said car body of at least 1⅝ inch from a fully-loaded condition of said car, the springs of said car having a spring rate of not more than A pounds per inch for the entire car, where A is equal to about 0.40 times the weight of the spring-borne portion of the gross rail load of said car.

4. The railroad freight car of claim 1 wherein said lower portion of said web plate is disposed diagonally downward and inward at an obtuse angle to said longitudinally extending upper portion of said web plate.

5. The railroad freight car of claim 1 wherein said top tube includes a channel structure, formed of plate material having a pair of outwardly directed legs and a vertical central portion, and a vertical outer side, said web plate being an extension of said vertical outer side of said top tube.

6. A railroad freight car having a single car body defining a well for receiving and carrying intermodal cargo containers, comprising:

(a) a pair of transversely extending body bolsters located at respective opposite ends of said body;

(b) a pair of side sills extending longitudinally of the car and attached respectively to said body bolsters, each of said side sills being of lightweight construction including (i) a deep top tube portion of rectangular shape;

(ii) a web plate depending from said top tube, said web plate including a longitudinally extending upper portion and a longitudinally extending lower portion defined by a longitudinally extending bend in said web plate;

(iii) a bottom chord welded to said lower portion of said web plate and made of material of a significantly greater thickness than that of said web plate, said bottom chord including an upwardly directed portion and a generally horizontal portion interconnected by a bend extending horizontally and longitudinally of the car, said lower portion of said bottom chord extending laterally inward of the car;

(c) two unshared trucks supporting said car body, located at respective opposite ends of said body; and (d) a plurality of container support assemblies each including a container support member of thick plate metal cold formed to include a generally horizontally extending foot portion and a generally upwardly directed portion, attached by a plurality of mechanical fasteners to a respective container support hanger bracket of relatively thin metal plate welded to one of said side sills.

7. The railroad freight car of claim 6 wherein said foot portions of said container support members rest atop said horizontal, lower portion of said bottom chord of said sill structure.

8. The railroad freight car of claim 6 wherein a pair of said container support assemblies are located laterally opposite each other, said pair of container support assemblies being interconnected by a transversely extending member having a pair of respective ends and a pair of hinges interconnecting each container support member of said pair of container support assemblies with a respective end of said transversely extending member through a respective one of said hinges.

9. The railroad freight car of claim 6, further including a pair of roller-assisted constant-contact side bearings associated with each of said trucks for supporting said car body and providing a limited amount of frictional resistance to rotation of each of said trucks with respect to said car body about a respective vertical axis of rotation of each of said trucks, said car exerting a gross rail load including a spring-borne portion thereof, each of said two unshared trucks being equipped with springs and providing a vertical reserve travel of said car body of at least 1⅝ inch from a fully-loaded condition of said car, the springs of each truck having a spring rate of not more than A pounds per inch for the entire truck, where A is equal to about 0.40 times the weight of the spring-borne portion of the gross rail load of said car.

10. A railroad freight car having a single car body defining a container well for receiving an intermodal cargo container, comprising:

(a) a pair of body bolsters extending transversely;

(b) a pair of upstanding side sills extending longitudinally of the car and attached respectively to said body bolsters, said container well for receiving an intermodal cargo container being defined between said body bolsters and side sills;

(c) a plurality of container support members associated with said side sills, each of said container support members consisting primarily of a thick metal plate cold formed to include a generally horizontally extending portion including means for receiving a cargo container resting thereon, and a generally upwardly directed portion;

(d) respective attachment means for connecting said container support members to said side sill;

(e) respective transverse members interconnecting said generally horizontally extending portions of said laterally oppositely located ones of said container support members, said transverse members being connected to respective ones of said container support members by respective hinges attached to said horizontally extending portions, said hinges defining hinge pivot axes extending horizontally and longitudinally of said car and permitting said container support members to flex downwardly with respect to said side sills and apply tension to transverse members without application of bending stress thereto; and (f) two unshared trucks supporting said car body, located at respective opposite ends of said body.

11. The railroad freight car of claim 10, further including a pair of roller-assisted constant-contact side bearings associated with each of said trucks for supporting said car body and providing a limited amount of frictional resistance to rotation of each of said trucks with respect to said car body about a respective vertical axis of rotation.

12. The railroad freight car of claim 10 wherein said car has a gross rail load including a spring-borne portion thereof and wherein each of said two unshared trucks is equipped with springs which provide a vertical reserve travel of said car body of at least 1⅜ inch from a fully-loaded condition of said car, the springs of said car having a spring rate of not more than A pounds per inch for the entire car, where A is equal to about 0.40 times the weight of the spring-borne portion of the gross rail load of said car.

13. The railroad freight car of claim 10 wherein said metal plate includes a bend portion interconnecting said generally horizontally extending portion with said generally upwardly directed portion, said bend portion having greater strength than said horizontally extending portion and said upwardly directed portion to resist cracking of said container support member when said car is loaded.

14. A railroad freight car including a container well for receiving an intermodal cargo container, comprising:

(a) a pair of body bolsters extending transversely;

(b) a pair of upstanding side sills extending longitudinally of the car and attached respectively to said body bolsters, said container well for receiving an intermodal cargo container being defined between said body bolsters and said side sills;

(c) a plurality of container support members associated with said side sills, each of said container support members consisting primarily of a thick metal plate cold formed to include a generally horizontally extending portion including means for receiving a cargo container thereon and a generally upwardly directed portion;

(d) respective attachment means for connecting said container support members to said side sills, said attachment means including a respective container support hanger bracket of metal plate welded to one of said side sills for each of said plurality of container support members, each of said container support hanger brackets and container support members defining a plurality of fastener bores aligned with one another and each of said container support members being fastened to a respective one of said container support hanger brackets by mechanical fasteners extending through said fastener bores; and (e) two unshared trucks supporting said car body, located at respective opposite ends of said body.

15. The railroad freight car of claim 14, further including a pair of roller-assisted constant-contact side bearings associated with each of said trucks for supporting said car body and providing a limited amount of frictional resistance to rotation of each of said trucks with respect to said car body about a respective vertical axis of rotation.

16. The railroad freight car of claim 14 wherein said car exerts a gross rail load including a spring-borne portion thereof and wherein each of said two unshared trucks is equipped with springs which define a vertical range of movement of at least 1⅜ inch from a fully-loaded condition of said car, the springs of said car having a spring rate of not more than A pounds per inch for the entire car, where A is equal to about 0.40 times the weight of the spring borne portion of the gross rail load of said car.

17. The railroad freight car of claim 14 wherein each of at least one pair of said container support members includes two upwardly extending legs, said car further including a pair of transversely extending end container support hanger brackets each attached to one of said body bolsters, and a leg of each of said pair of container supports being fastened by mechanical fasteners to a respective one of said end container support hanger brackets.

18. The railroad freight car of claim 14 wherein each of at least one pair of container support members includes two upwardly extending legs, said car further including a pair of end container support hanger brackets each attached to a respective one of said side sills, and one of said upwardly extending legs of each of said pair of container support members being connected to a respective one of said end container support hanger brackets by a plurality of mechanical fasteners.

19. The railroad freight car of claim 1 wherein said trucks have truck centers separated by a distance of at least about 50 feet.

* * * * *

UNITED STATES PATENT AND TRADEMARK OFFICE
CERTIFICATE OF CORRECTION

PATENT NO. : 5,170,718
DATED : December 15, 1992
INVENTOR(S) : Charles Hill et al.

It is certified that error appears in the above-identified patent and that said Letters Patent is hereby corrected as shown below:

Col. 8, Line 9    Delete "123/16" and insert --12 3/16-- in place thereof;

Line 11    Delete "149/16" and insert --14 9/16-- in place thereof;

Line 12    Delete "511/16" and insert --5 11/16-- in place thereof;

Line 21    Delete "85/16" and insert --8 5/16-- in place thereof.

Col. 18   Line 22    After "said" insert --side--.

Signed and Sealed this

Fourteenth Day of December, 1993

Attest:

BRUCE LEHMAN

*Attesting Officer*    *Commissioner of Patents and Trademarks*